(12) United States Patent
Qu et al.

(10) Patent No.: US 10,229,298 B2
(45) Date of Patent: Mar. 12, 2019

(54) RFID DEVICES USING METAMATERIAL ANTENNAS

(71) Applicant: HAND HELD PRODUCTS, INC., Fort Mill, SC (US)

(72) Inventors: Huyu Qu, San Jose, CA (US); Fouad Nusseibeh, Champlin, MN (US); Ynjiun Paul Wang, Cupertino, CA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 595 days.

(21) Appl. No.: 13/960,430

(22) Filed: Aug. 6, 2013

(65) Prior Publication Data
US 2015/0041541 A1   Feb. 12, 2015

(51) Int. Cl.
| | |
|---|---|
| *G06K 7/10* | (2006.01) |
| *H01Q 1/22* | (2006.01) |
| *H01Q 9/42* | (2006.01) |
| *H01Q 15/00* | (2006.01) |
| *H01Q 5/371* | (2015.01) |

(52) U.S. Cl.
CPC ..... *G06K 7/10356* (2013.01); *G06K 7/10316* (2013.01); *G06K 7/10346* (2013.01); *H01Q 1/2216* (2013.01); *H01Q 5/371* (2015.01); *H01Q 9/42* (2013.01); *H01Q 15/0086* (2013.01)

(58) Field of Classification Search
USPC .......................................... 235/439; 343/893
See application file for complete search history.

(56) References Cited

U.S. PATENT DOCUMENTS

| | | | |
|---|---|---|---|
| 6,992,627 B1 * | 1/2006 | Honda ................... | H01Q 1/243 343/700 MS |
| 2001/0007445 A1 * | 7/2001 | Pankinaho ............. | H01Q 1/243 343/844 |

* cited by examiner

*Primary Examiner* — Rafferty Kelly
(74) *Attorney, Agent, or Firm* — Oliff PLC; R. Brian Drozd

(57) ABSTRACT

An antenna system may include a first metamaterial antenna having a first resonant frequency and a second metamaterial antenna having a second resonant frequency. The first resonant frequency may be different from the second resonant frequency. A first feed point may be connected to the first metamaterial antenna, and a second feed point may be connected to the second metamaterial antenna. A signal may be applied to the first and second feed points so that the first and second metamaterial antennas radiates electromagnetic energy while the signal is being applied and so that the antenna system is configured to send or receive signals over both the first and second resonant frequency bands.

20 Claims, 9 Drawing Sheets

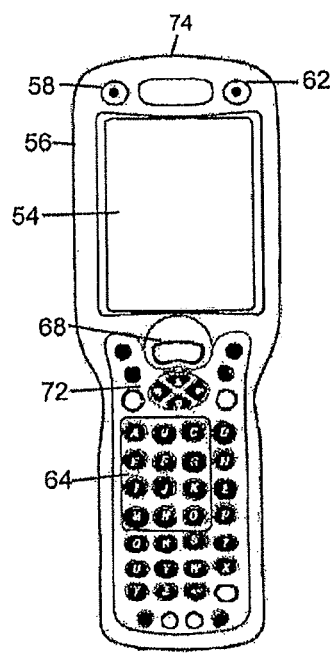 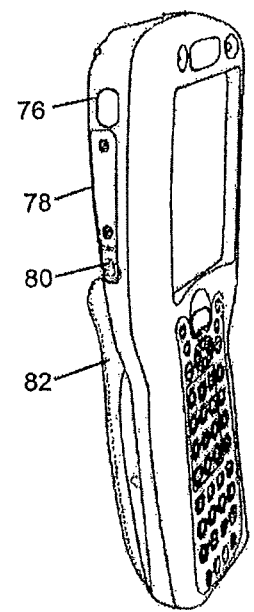
FIG. 1A  FIG. 1B
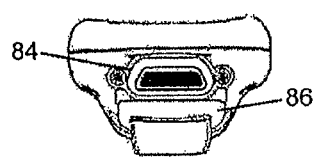
FIG. 1C

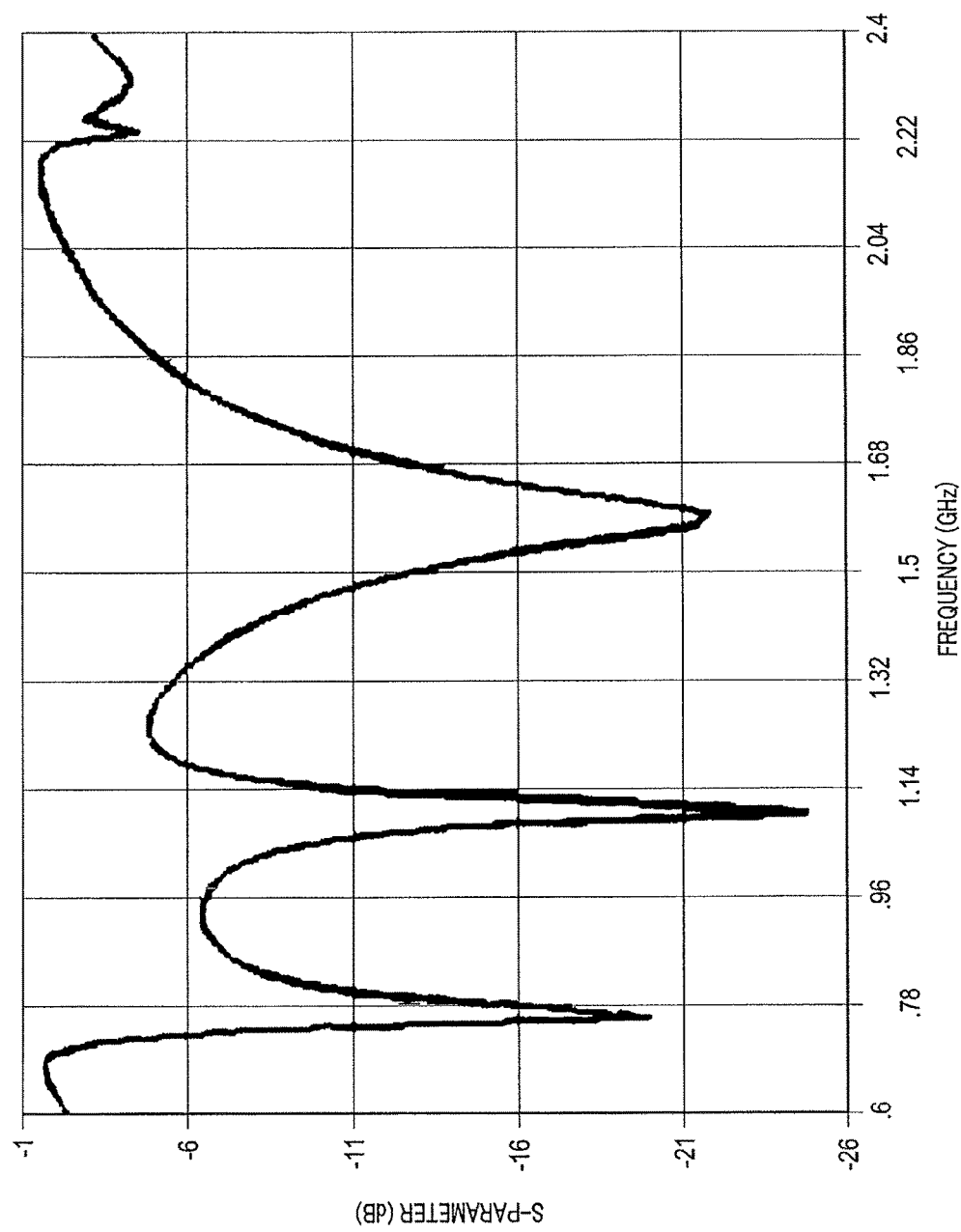

US 10,229,298 B2

RFID DEVICES USING METAMATERIAL ANTENNAS

FIELD OF THE INVENTION

The invention is generally related to radio frequency identifier (RFID) devices and is specifically related to RFID tags and RFID reading devices using metamaterial antennas.

BACKGROUND OF THE INVENTION

RFID methods are widely used in a number of applications, including smart cards, item tracking in manufacturing and retail, etc. An RFID tag can be attached to an object, such as a retail item. An encoded information reading (EIR) terminal deployed at the cashier's desk can be equipped with an RFID reader to read and/or modify the memory of an RFID tag attached to a retail item. However, the antenna of the RFID reader may be susceptible to environments and may not have a broad bandwidth. A small environmental factor (e.g., hand position on the terminal, etc.) may shift the band off targeted frequency, and greatly downgrade the performance.

SUMMARY OF THE INVENTION

There is provided an antenna system to increase bandwidth of antennas, such as metamaterial antennas in an RFID reader. Antenna systems may include multiple antenna elements, each of which may comprise different resonant frequencies. By allowing these multiple antenna elements to radiate at the same time or in an alternating fashion, the multiple resonant frequencies of the antenna signal increase the bandwidth of the antenna system.

In one aspect, a system may include a RFID reader having an antenna system mounted on a dielectric substrate. The antenna system may include one or more spatially separated conductive cell patches mounted on a dielectric substrate, a conductive feed line spatially separated from the conductive cell patches, and a stripline portion extending from the conductive feed line. In one embodiment, at least two resonant frequencies are generated by the system so as to increase the bandwidth of the system.

In another aspect, an antenna system may include a RFID reader having at least one metamaterial antenna mounted on a substrate and is configured to have an overall bandwidth. The metamaterial antenna may include a first antenna and a second antenna. The first antenna may include a conductive feed line and may be configured to radiate electromagnetic energy at a first resonant frequency and have a first bandwidth. The second antenna may include a stripline portion extending from the conductive feed line and may be configured to radiate electromagnetic energy at a second resonant frequency and have a first bandwidth. The first resonant frequency may be different from the second resonant frequency so that the first bandwidth is added to the second bandwidth to make up the overall bandwidth.

In yet another aspect, an antenna system may include a first metamaterial antenna having a first resonant frequency and a second metamaterial antenna having a second resonant frequency. The first resonant frequency may be different from the second resonant frequency. A first feed point may be connected to the first metamaterial antenna, and a second feed point may be connected to the second metamaterial antenna. A signal may be applied to the first and second feed points so that the first and second metal material antennas radiates electromagnetic energy while the signal is being applied and so that the antenna system is configured to send or receive signals over both the first and second resonant frequency bands.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 1A, 1B, and 1C schematically illustrate views of one embodiment of a RFID reader;

FIG. 5 illustrates an S-parameter plot of the antenna of FIG. 4B according to one embodiment.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 2:
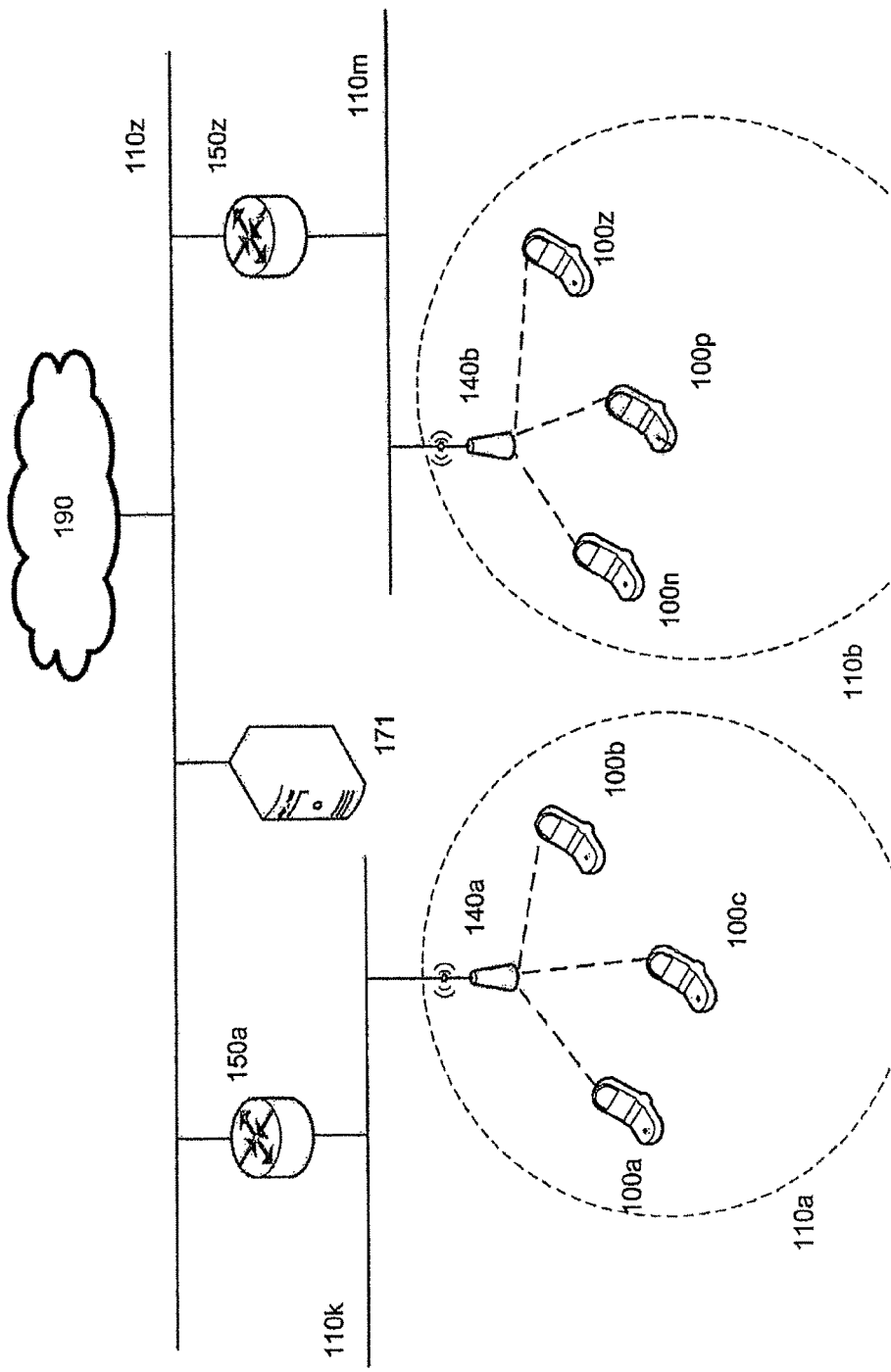
FIG. 2 depicts a network-level layout of a data collection system utilizing RFID readers according to one embodiment.

In one embodiment, there is provided a reader, such as an encoded information reading (EIR) terminal, comprising a radio frequency identifier (RFID) reading device. The RFID reader can be configured to read RFID tags containing encoded messages. In one embodiment, the RFID reader can be configured to read a RFID tag containing an encoded message and output raw message data containing the encoded message. In another embodiment, the RFID reader can be configured to read a RFID tag containing an encoded message and output decoded message data corresponding to the encoded message.

Various embodiments of the RFID reader can be used in a numerous applications, including but not limited to, authentication and access control systems (for example, using smart cards), item tracking in manufacturing and retail, etc. A smart card is an identification card (e.g., a credit card, a pass card) which does not need to be swiped or otherwise physically contacted by a card reader. This capability can be implemented by placing a RFID tag in the card. Item tracking can be implemented by placing a RFID tag on each individual item. In retail, item tracking with RFID tags can be used in conjunction with other technologies such as bar code scanning and payment terminals. Item tracking with RFID tags can be used in loss prevention systems by placing an RFID tag into merchandise items and placing sensors at exit points. If an exit sensor detects a tagged item with a tag, which was not deactivated at the checkout, an alarm can go off.

One embodiment of RFID reader 100 is shown in in FIGS. 1A (front panel view), 1B (side panel view), and 1C (bottom panel view). RFID reader 100 can comprise housing 52 within which other components of RFID reader 100 can be disposed. LCD screen display with touch screen sensor 54 can be disposed on the front panel 56. Also disposed on front panel 56 can be decode LED 58, scan LED 62, and keyboard 64 including scan key 68 and navigation keys 72. Imaging window 74 can be disposed on the top panel of housing 52. Disposed on the side panel (best viewed in FIG. 1B) can be infrared communication port 76, access door to a secure digital (SD) memory interface 78, audio jack 80, and hand strap 82. Disposed on the bottom panel (best viewed in FIG. 1C) can be multi-pin mechanical connector 84 and hand strap clip 86.

While FIGS. 1A-1C illustrate a hand held housing, a skilled artisan would appreciate the fact that other types and form factors of terminal housings are within the scope of this disclosure.

In a further aspect, the RFID reader can be incorporated in a data collection system. The data collection system, schematically shown in FIG. 2, can include a plurality of RFID readers 100*a*-100*z* in communication with a plurality of interconnected networks 110*a*-110*z*. In one aspect, the plurality of networks 110*a*-110*z* can include at least one wireless communication network. In a further aspect, a RFID reader can comprise a communication interface which can be used by the terminal to connect to one or more networks 110*a*-110*z*. In one embodiment, the communication interface can be provided by a wireless communication interface.

The RFID reader 100*c* can establish a communication session with the host computer 171. In one embodiment, network frames can be exchanged by the RFID reader 100*c* and the host computer 171 via one or more routers, base stations, and other infrastructure elements. In another embodiment, the host computer 171 can be reachable by the RFID reader 100*c* via a local area network (LAN). In a yet another embodiment, the host computer 171 can be reachable by the RFID reader 100*c* via a wide area network (WAN). A skilled artisan would appreciate the fact that other methods of providing interconnectivity between the RFID reader 100*c* and the host computer 171 relying upon LANs, WANs, virtual private networks (VPNs), and/or other types of network are within the scope of this disclosure.

In one embodiment, the communications between the RFID reader 100*c* and the host computer 171 can comprise a series of HTTP requests and responses transmitted over one or more TCP connections. In one embodiment, the communications between the RFID reader 100*c* and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the RFID reader can include decoded message data corresponding to, e.g., a bar code label or a RFID label attached to a product or to a shipment item. For example, a RFID reader can transmit a request to the host computer to retrieve product information corresponding to a product identifier encoded by a bar code label attached to the product, or to transmit an item tacking record for an item identified by a bar code label attached to the product.

Component-level diagram of one embodiment of a RFID reader is now being described with reference to FIG. 3. RFID reader 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, RFID reader 100 can comprise a single microprocessor which can be referred to as a central processing unit (CPU). In another embodiment, RFID reader 100 can comprise two or more microprocessors, for example, a CPU providing some or most of the RFID reader functionality and a specialized microprocessor performing some specific functionality. A skilled artisan would appreciate the fact that other schemes of processing tasks distribution among two or more microprocessors are within the scope of this disclosure.

RFID reader 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol LTE protocol and/or at least one protocol of the CDMA/1×EV-DO protocol family.

RFID reader 100 can further comprise a keyboard interface 354 and a display adapter 355, both also coupled to the system bus 370. RFID reader 100 can further comprise a battery 356. In one embodiment, the battery 356 can be provided by a replaceable rechargeable battery pack.

RFID reader 100 can further comprise a GPS receiver 380. RFID reader 100 can further comprise at least one connector 390 configured to receive a subscriber identity module (SIM) card.

RFID reader 100 can further comprise one or more reading devices 330, provided, for example, but not limited to, by a RFID reading device, a bar code reading device, or a card reading device. In one embodiment, the RFID terminal can be configured to read an encoded message using reading device 330, and to output raw message data containing the encoded message. In another embodiment, the RFID terminal can be configured to read an encoded message using reading device 330, and to output decoded message data corresponding to the encoded message. As used herein, "message" is intended to denote a character string comprising alphanumeric and/or non-alphanumeric characters according to one embodiment. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

As noted herein supra, in one embodiment, RFID reader 100 can further comprise a RFID reading device 333. RFID reader 100 can be configured to read RFID tags containing decoded messages. In one embodiment, the RFID terminal can be configured to read, using RFID reading device 333, a RFID tag containing an encoded message, and to output raw message data containing the encoded message. In another embodiment, the RFID terminal can be configured to read, using RFID reading device 333, a RFID tag containing an encoded message, and to output decoded message data corresponding to the encoded message.

In a further aspect, the RFID reading device can comprise an antenna 338. In one embodiment, the antenna 338 of FIG. 3 can be provided by a metamaterial (MTM) antenna.

Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an MTM antenna can have a size of 33 mm.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, $\beta$), where E is the electrical field, H is the magnetic field, and $\beta$ is the phase velocity) exhibiting a positive refractive index, a metamaterial due to its artificial structure can exhibit a negative refractive index and follow the left-hand rule for the trio (E, H, $\beta$). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

MTM antennas have a relatively narrow bandwidth. For CRLH materials, the left-hand resonant frequency bands are narrower than the same order right-hand resonant frequency bands. Because of such narrow bandwidth, MTM antennas may be susceptible to environments. A small factor may shift the band off targeted frequency, and greatly downgrade the performance. To correct such issue, various antennas may be designed to lower the return loss and thus, increase the bandwidth, such as the antennas discussed below in FIGS. 4A, 4B and 6.

Figure 3:
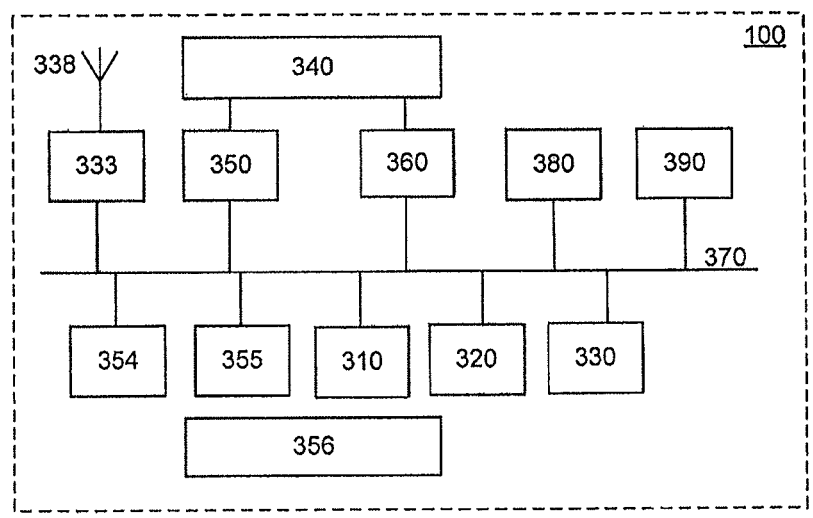
FIG. 3 depicts component-level layout of a RFID reader according to one embodiment.
Figure 4A:
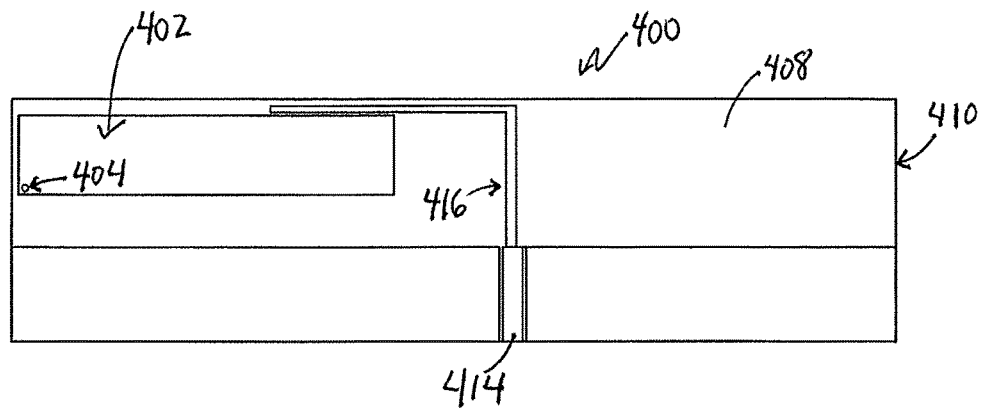
FIGS. 4A-4B illustrate various embodiments of multiple cell metamaterial (MTM) antennas.

In one embodiment, antenna 338 of FIG. 3 can be provided by an MTM antenna 400 shown in FIG. 4A. FIG. 4A (top view) illustrates an antenna 400 that can comprise one or more conductive cell patches 402 that can be mounted on a dielectric substrate 408, provided, for example, by a printed circuit board (PCB) 410. Conductive cell patch 402 can be spatially separated from other cell patches (not illustrated in FIG. 4A) so that capacitive couplings between adjacent cell patches can be created. Also disposed on the dielectric substrate 408 can a feed pad 414 that can be provided, e.g., by a metallic plate and can be connected to a conductive feed line 416. Conductive feed line 416 can be provided, e.g., by metallic a strip. Conductive feed line 416 can be located close but separately from conductive cell patch 402. Conductive feed line 416 may be in an L-shape configuration as illustrated in FIG. 4A. A skilled artisan would appreciate the fact that MTM antennas having two or more conductive feed lines are within the scope of this disclosure. A ground plane (not shown in FIG. 4A) can be provided by a metallic layer disposed on the bottom side of PCB 410. Each cell patch 402 can be connected to the ground plane by a via 404.

In one embodiment, the conductive feed line 416 coupling with the conductive cell patch 402 creates a capacitance by the proximity of the conductive feed line 416 with the conductive cell patch 402. Additionally, the via 404 may connect to a stripline (not shown) that extends to a ground plane, which acts as an inductor. Thus, the MTM antenna of FIG. 4A may be an "LC" circuit which creates a transmission line antenna.

In one embodiment, feed pad 414 can be electrically coupled to coaxial cable connector (not shown). In one embodiment, the coaxial cable connector can be connected from the bottom side of antenna 400. In another embodiment, the coaxial cable connector can be connected from a lateral side of antenna 400. In a yet another embodiment, feed pad 414 can be electrically coupled to a twisted cable.

Also disposed on the top surface of dielectric substrate 410 can be one or more ground planes provided, e.g., by one or more metallic plates.

One or more conductive cell patches 402 can be connected by one or more vias 404 to one or more conductive via lines (not shown) disposed on the bottom surface of dielectric substrate 410. At least one conductive via line can comprise a via line tuner (not shown) provided by a conductive strip having a curved line form or an open polygon line form. A via line tuner can be used to adjust resonant frequency of antenna 400 as explained herein infra. Also disposed on the bottom surface of dielectric substrate 410 can be a bottom ground plane.

First Embodiment Antenna to Generate Additional Resonance Frequencies

Figure 4B:
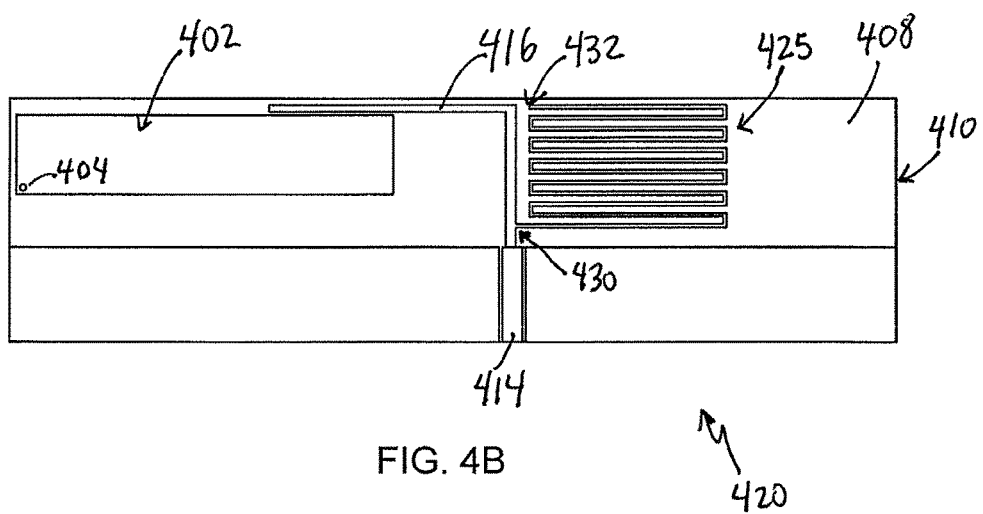

FIG. 4B illustrates an example of another MTM antenna 420 with increased bandwidth. FIG. 4B, in one embodiment, may include features similar to the MTM antenna of FIG. 4A, such as conductive feed line 416 coupled to conductive cell patch 402, via 404, dielectric substrate 408, and feed pad 414. Additionally, the MTM antenna of FIG. 4B may include a stripline portion 425 extending from a portion 430 of the conductive feed line 416. The length of the stripline portion 425 may be variable so that the resonant frequency generated by the addition of the stripline portion 425 is in addition to resonant frequencies in the circuit of FIG. 4A (i.e., without the stripline portion 425). By varying how long the stripline portion 425 is, a user can vary the insertion losses and bandwidth of an antenna, such as an RFID antenna.

FIG. 5 illustrates a graph of the insertion/return loss (S11) for the antenna of FIG. 4B. As illustrated, without stripline portion 425, the resonant frequency (LH) of this MTM antenna may be at a first frequency, such as about 780 MHz. However, with the stripline portion 425, the particular length of the stripline portion 425 of FIG. 4B creates additional resonant frequency (RH), such as at about 1120 MHz. The stripline portion 425 may therefore work similar to a monopole antenna in a superposition onto an existing antenna. By adjusting the total length of the stripline portion 425, one can tune the second resonant frequency close to the first resonant frequency. When the first and second resonant frequencies are in a range close to each other, the insertion losses about that range are reduced so that the resonant frequencies together widen the bandwidth.

The stripline portion 425 (FIG. 4B) may be designed in a manner to adjust the resonant frequencies. For example, in one embodiment, the stripline portion 425 is shaped to be in a "zig-zag" manner, as illustrated in FIG. 4B. In this regard, the stripline portion 425 may be a single conductive, radiative strip that has a particular length that is configured to be in a pattern that winds back and forth along to fit within a particular area. The length of the stripline pattern 425 is calculated by measuring the total length of the strip that winds back and forward from portion 430 to the stripline pattern end 432. The total length of the stripline portion 425 may be a quarter wavelength of the desired wavelength. For example, at 915 MHz, the wavelength is 12.78 inches. As such, the length of stripline portion 425 may be 3.195 inches (=12.78 inches/4).

It should be understood that the stripline portion 425 need not be in a winding or "zig-zag" pattern. For example, the stripline portion 425 may be a straight section or may be orientated in a circular pattern. The stripline portion 425 may be oriented to form other shapes and configurations as long as the stripline portion 425 is an extended conductive strip having a certain length.

The stripline portion 425 is electrically communicative with and extends from the conductive feed line 416 at 430. The resonant frequency may also be adjusted by varying where on the conductive feed line 416 that the stripline portion 425 extends from. For example, the stripline portion 425 may extend from a portion of the conductive feed line 416 that is closer to the bend 432 in the "L"-shaped conductive feed line than the feed pad 414. By varying the portion where the stripline portion 425 extends from the conductive feed line 416, the stripline portion 425 may vary the resonant frequency of the antenna system. In this regard, the stripline portion 425 may act as a feed line tuner.

In one embodiment, the stripline portion 425 is directly connected to the conductive feed line 416 so as to be in electrical communication with the feed pad 414. However, the stripline portion 425 may be capacitively coupled with the conductive feed line 416 instead of being in electrical communication with the conductive feed line 416. Regardless, the stripline portion 425 may act as an antenna element separate from the antenna element resulting from the combination of the conductive feed line 416 and cell patch 402.

The stripline portion 425 of FIG. 4B may increase the bandwidth of the antenna system of FIG. 4A. For example, referring back to FIG. 5, the antenna of FIG. 4A only has the resonance frequencies shown at 780 MHz and 1.52 GHz. The bandwidth at each of these frequencies is relatively low. For example, if a bandwidth is at 5 dB down, the bandwidth at 780 MHz would be able 200 MHz and the bandwidth at 1.52 GHz would be 550 MHz. However, as mentioned above, the stripline portion 425 adds an additional resonant frequency at 1120 MHz which lowers the insertion loss over the complete range from 780 MHz to 1.5 GHz and thus, the bandwidth at 5 dB down with the antenna system of FIG. 4B is 1.15 GHz. Comparing 1.15 GHz with 550 MHz or 200 MHz illustrates a substantial increase in bandwidth.

It should be understood that more than one stripline portion 425 may extend from the conductive feed line 416 and thus, the present invention should not be limited to a single the stripline portion. Each additional stripline portion extending from the conductive feed line 416 may have a different length and thus a different resonant frequency to further reduce insertion losses and increase bandwidths.

Second Embodiment Antenna to Generate Additional Resonance Frequencies

Figure 6:
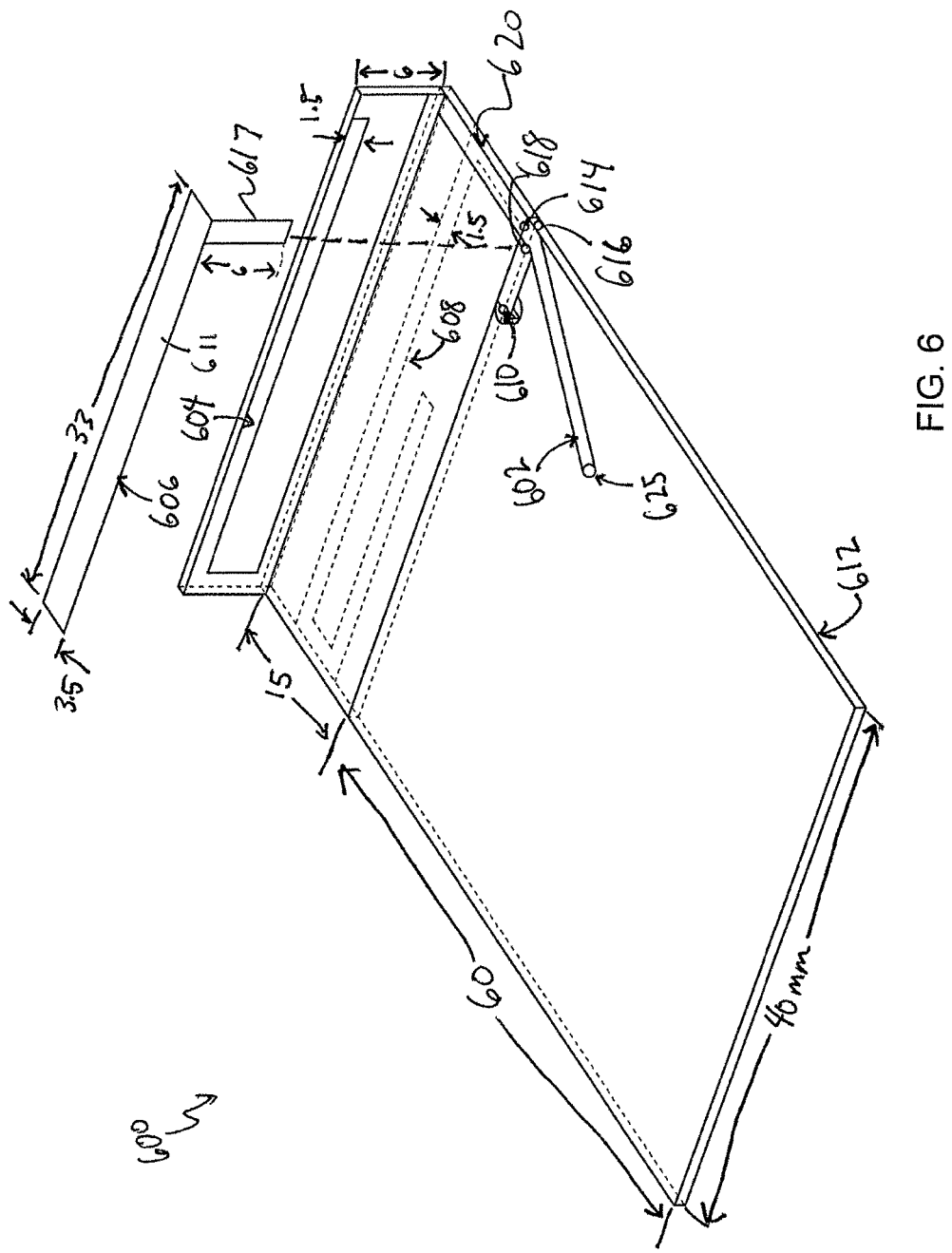
FIG. 6 illustrates an antenna system generating multiple resonant frequencies according to one embodiment.

FIG. 6 illustrates an antenna system 600 generating multiple resonant frequencies according to one embodiment. Antenna system 600 may include a plurality of antennas. For example, the antenna system 600 of FIG. 6 includes three monopole antennas 604, 606, and 608. The monopole antennas 604, 606, and 608 are each fed at a common feed point 614. Monopole 604 extends along a plane that is perpendicular to the printed circuit board 615. Monopole 604 has a first length and is configured to generate a first resonant frequency for the antenna system 600. Monopole 604 is connected to feed point 614 via strip portion 620.

Monopole 606 extends along a plane that is parallel to but separate from a plane defined by the printed circuit board 615. Monopole 606 has a second length and is configured to generate a second resonant frequency for the antenna system 600. It is noted that monopole 606 has a first section 611 and a second portion 617. The first section 611 is electrically connected to and is orthogonal to the second section 617. The second section 617 is configured to extend the first section to the plane that is parallel to but separate from the plane defined by the printed circuit board 615. In this regard, the second section 617 may be considered an extending portion of monopole 606. Second section 617 extends to feed point 614.

Monopole 608 extends along a plane that is parallel a plane defined by the printed circuit board but may be in a plane that is separate from the plane defined by monopole 606. In this regard monopole 606 and monopole 608 may be disposed in parallel but separate planes. In the illustrative embodiment, monopole 608 is disposed on the bottom side of printed circuit board 615. Monopole 608 has a third length and is configured to generate a third resonant frequency.

As illustrated in FIG. 6, monopole 606 has a shorter length than monopoles 608 and 604, while monopole 608 has a shorter length than monopole 604. As such, the first, second, and third resonant frequencies may all be different resonant frequencies.

A ground plane 612 is provided on the bottom side of the printed circuit board 615. A via 610 extends proximate to the feed point to the ground plane 612. Additionally, a shorting point is provided at 616 to the grounding plane. Point 618 is a connecting point to feedline 602.

A microstrip feed line (e.g., a 50 ohm feedline) 602 extends from feed point 614 to point 625. Point 625 extends below the ground plane 612 to a connector (e.g., SMA connector).

In operation, the monopoles 604, 606, and 608 are all connected to the same feed point. As such, when power is applied to the feed point, all of the monopoles will be energized and radiate signals. Thus, all three monopoles 604, 606, and 608 simultaneously transmit signals in the illustrative embodiment of FIG. 6.

Figure 8:
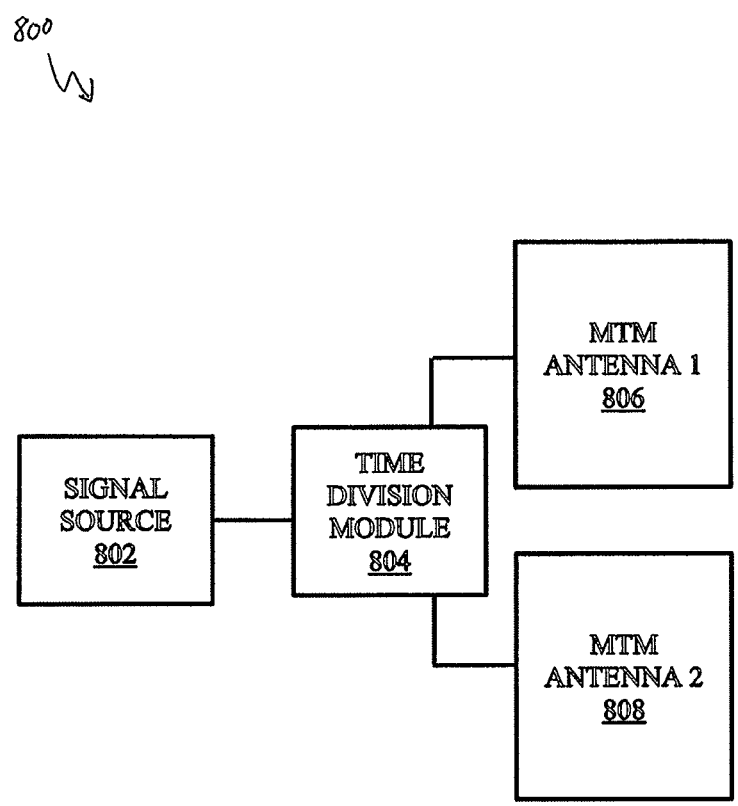
FIG. 8 illustrates an MTM antenna in time-division mode according to one embodiment.

However, in another embodiment, if the feed point is separated as separate feed points which each respectively go to each monopole, the signal may be delivered to the monopoles by time-division multiplexing (similar to that discussed with regard to FIG. 8). For example, if a signal is being transmitted over a three millisecond period, the full signal is applied to a first monopole (e.g., monopole 604) during the first millisecond, to a second monopole (e.g., monopole 606) during the second millisecond, and then to a third monopole (e.g., monopole 608) during the third millisecond. This process continually repeats so that only one monopole is receiving power at a time but the power is being rotated to each monopole sequentially.

Figure 7:
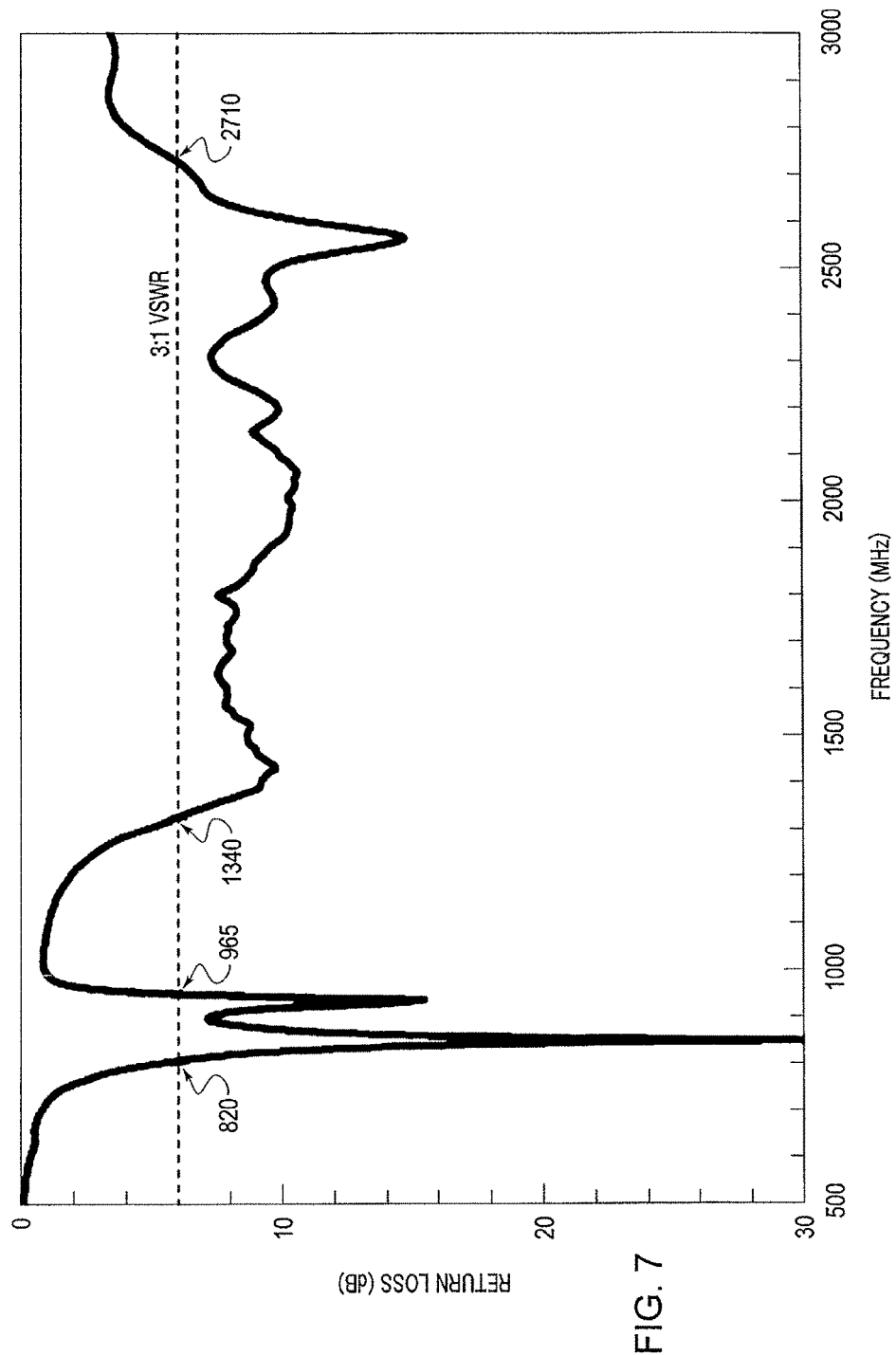
FIG. 7 illustrates a plot of the return loss the antenna of FIG. 6 according to one embodiment.

FIG. 7 illustrates a plot of the return loss the antenna of FIG. 6 according to one embodiment. As illustrated the combined monopoles (604, 606 and 608) all create at least three resonant frequencies which, therefore, lower the return loss for the antenna system 600. As illustrated in FIG. 7, the antenna system 600 has a voltage standing wave ration (VSWR) of at least 3:1 from 1.34 GHz to 2.71 GHz as well as between 820 MHz to 965 MHz.

FIG. 8 illustrates an MTM antenna system 800 in time-division mode according to one embodiment. As illustrated, the MTM antenna system 800 may include a first MTM antenna 806, a second MTM antenna 808, and a time division multiplexing module 804. A signal source 802 supplies a signal to the time division multiplexing module 804. The time division multiplexing module 804 is configured to supply the signal from the signal source 802 to the antennas 806, 808 in an serial manner. For example, the signal is first applied to antenna 806 while not being applied to antenna 808. After a predefined amount of time, the time division multiplexing module 804 then switches the signal from antenna 806 to antenna 808. This process alternates between antennas so that the antennas are transmitting signals in a continuous but periodic manner. It should be noted that the antennas may not receive the signal from the signal source 802 at the exact same time but to be operated periodically over the same time range. However, the full amount of power from the signal is received by each antenna when the signal is applied to each antenna.

The antenna system of FIG. 8 allows for two MTM antennas to be in operation at substantially during the same time range. Each MTM antenna 806, 808 may have different resonant frequencies. As such, by operating the MTM antennas during a same time range, the resonant frequencies effectively increase the bandwidth and/or lower the return loss of the antenna system.

It should be noted that the time division multiplexing module 804 is disposed between the antennas and the signal source. The antennas 806, 808 may not have a common feed point so that the time division multiplexing module 804 can apply a signal to one antenna while the other antenna does not receive such signal.

Figure 9:
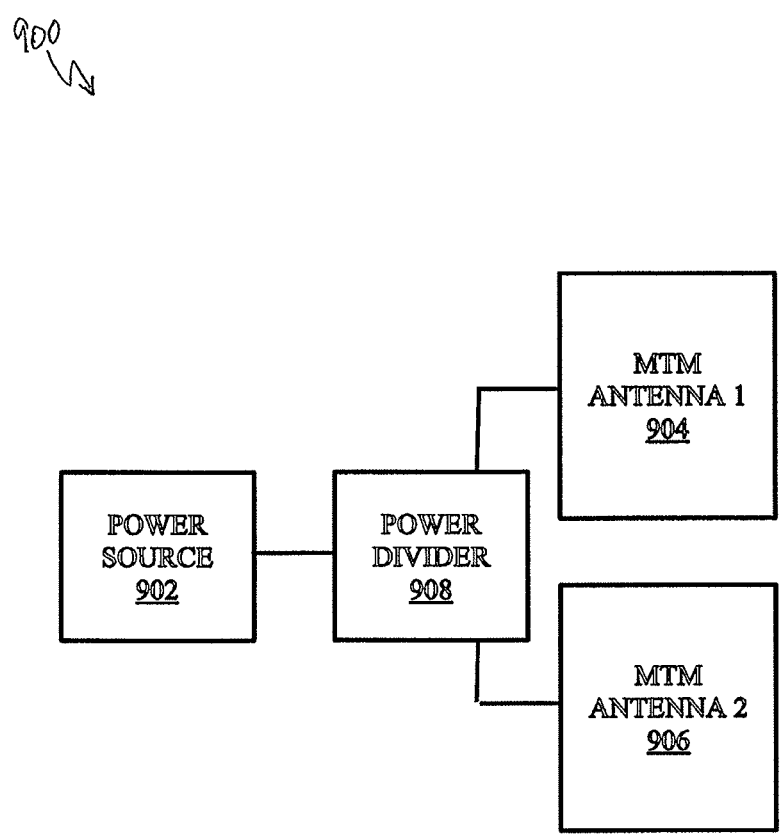
FIG. 9 illustrates an MTM antenna after a divider according to one embodiment.

FIG. 9 illustrates an MTM antenna system 900 after a divider according to one embodiment. Such antenna system 900 may include a first MTM antenna 904, a second MTM antenna 906, and a power divider 908. The power divider 908 is connected to a power source. The first MTM antenna 904 and the second MTM antenna 906 are connected after (or at the output of) the power divider 908. For example, the output of the power divider 908 may be connected to a common node which may be directly connected to both the first MTM antenna 904 and the second MTM antenna 906. In this regard, the first MTM antenna 904 and the second MTM antenna 906 would have a common feed point input so that when the power divider 908 receives power from the power source 902, both the first MTM antenna 904 and the second MTM antenna 906 receive power simultaneously. However, the power level of the first MTM antenna 904 and the second MTM antenna 906 are each a percentage (e.g., 50%) of the power output by the power source 902.

It should be noted that the power divider may, in one embodiment, be a means for connecting the inputs of both the first MTM antenna 904 and the second MTM antenna 906 together.

The first MTM antenna 904 and the second MTM antenna 906 may have different resonant frequencies. As such, by operating the first MTM antenna 904 and the second MTM antenna 906 during a same time range, the resonant frequencies effectively increase the bandwidth and/or lower the return loss of the antenna system.

It should be noted that the antennas systems 800, 900 of FIGS. 8 and 9 may be any plurality of antennas and need not be limited to only two antennas. For example, the antenna systems 800, 900 may have more than two antennas, such as a set of three antennas, four antennas, or any other antenna array.

Additionally, it should be understood that the antennas systems 800, 900 of FIGS. 8 and 9 may be any type of antenna, and therefore, not be limited to MTM antennas. In this regard, according to one aspect, the antennas discussed above can be broadband, ultrawideband (UWB), or multi-band (MB). The antennas can therefore be designed to support the desired functionality and characteristics. Antenna size, resonant frequencies, bandwidth, and matching properties can be controlled by changing the antenna design parameters including number and size of cells, the gap between the cells, the gap between the feed line and the cells, the size (radius and height) and location of vias, the length and width of the feed line, the length and width of the via line, the material and thickness of the substrate, and various other dimensions and layouts.

Antenna size and resonant frequency can be controlled by the patch shape and size as well as the length of the stripline portions or length of the antennas. Cell patches can have a rectangular, triangular, circular or other shape. In a further aspect, the resonant frequency can be sensitive to the via line length. To control the via line length, a via line tuner can be provided having a straight line form, a curved line form, or an open polygon line form. The via line length can be used to adjust resonant frequency due to its left hand inductive character. In a further aspect, the resonant frequency can be sensitive to the feed line length and the size of the gap between a feed line and a cell patch. To control the feed line length, a feed line tuner can be provided having a straight line form, a curved line form, or an open polygon line form. The feed line length can be used to adjust resonant frequency due to its left hand capacitive character. In a further aspect, the resonant frequency can be sensitive to the thickness of the substrate on which the antenna components are disposed. The substrate thickness can range from 0.1 mm to 150 mm depending upon the substrate material. Various materials having different permittivity can be used, for example, but not limited to, FR4 (∈r=4.4), Getek (∈r=4.0), Polyimide (∈r=3.5), Polyester (∈r=3.9), Arlon AD250 (∈r=2.5), RT/duroid 5880 (∈r=2.2), etc.

In another aspect, an antenna can comprise a single cell or multiple cells. A multi-cell antenna can have a smaller resonant frequency shift as compared to a single cell antenna, but also can have a higher peak gain due to a better beam concentration.

In another aspect, the antenna return loss can be controlled by the radius of one or more vias that connect the cell patches and the ground plane: vias having smaller radius can provide a better return loss.

In a further aspect, RFID reading device 333 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, RFID reader 100 can transmit information to a passive RFID tag by modulating an RF signal in the 860-960 MHz frequency range. An RFID tag can receive both information and operating energy from the RF signal transmitted by RFID reader 100. RFID reader 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the RFID reader 100. In one embodiment, the RFID tag can modulate the reflection coefficient of its antenna only responsive to receiving an RFID signal from RFID reader 100.

In a further aspect, RFID reader 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

RFID reader 100 can be configured to receive information from a RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by a RFID tag can be selected by RFID reader 100.

In another aspect, the communication link between RFID reader 100 and a RFID tag can be half-duplex, meaning that the RFID tag is not required to demodulate RFID reader's commands while backscattering. A half-duplex system means communication in both directions, but only one direction at a time (not simultaneously). Typically, once a party begins receiving a signal, it must wait for the transmitter to stop transmitting, before replying.

In another aspect, RFID reader can establish one or more sessions with one or more RFID tags. An RFID tag can support at least one session-dependent flag for every session. The session-dependent flag can have two states. An RFID tag can invert a session-dependent flag responsive to receiving a command from RFID reader 100. Tag resources other than session-dependent flags can be shared among sessions. In another aspect, an RFID tag can support a selected status flag indicating that the tag was selected by RFID reader 100.

Responsive to receiving an interrogation signal transmitted by RFID reader 100, an RFID tag can transmit a response signal back to RFID reader 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, RFID reader can implement EPC™ Class-1 Generation-2 UHF RFID Protocol for Communications at 860 MHz-960 MHz by EPCglobal. RFID reader 100 can interrogate RFID tags using the commands described herein infra.

Select command can be used by RFID reader 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or de-assert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by RFID reader 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response; and/or

NAK command can be used to force a tag to change its state to Arbitrate.

An RFID tag can implement a state machine. Once energized, a tag can change its current state to Ready. A selected tag can, responsive to receiving Query command, select a random integer from the range of [0; 2Q−1]. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, RFID reader can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of [0; 2Q−1], load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, RFID reader can send a QueryAdjust command causing the tag to invert its Inventoried flag and to transition to Ready state.

Access command set can be used by RFID reader 100 for communicating with (reading from and writing to) a tag. An individual tag must be uniquely identified prior to access. Access command set includes the following commands:

ReqRn command can be used by RFID reader 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by RFID reader 100 to read tag's Reserved, EPC, TID and User memory;

Write command can be used by RFID reader 100 to write to tag's Reserved, EPC, TID and User memory;

Kill command can be used by RFID reader 100 to permanently disable a tag;

Lock command can be used by RFID reader 100 to lock passwords preventing subsequent read or write operations; lock individual memory banks preventing subsequent write operations; permanently lock the lock status of passwords or memory banks;

Access command can be used by RFID reader 100 to cause a tag having a non-zero access password to transition from Open to Secured state.

A skilled artisan would appreciate the fact that other methods of interrogating RFID tags by RFID reader 100 are within the scope of this disclosure.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:

1. An apparatus comprising:
    an RFID reader comprising an antenna system mounted on a dielectric substrate;
        wherein the antenna system comprises:
            one or more spatially-separated conductive cell patches mounted on the dielectric substrate;
            a conductive feed line comprising a metallic strip mounted on the dielectric substrate, the conductive feed line being separated from but electromagnetically coupled with the one or more conductive cell patches so that the one or more conductive cell patches radiate electromagnetic energy as a first antenna; and
            a stripline portion contacting the conductive feed line and electrically connected to the conductive feed line so that the stripline portion radiates electromagnetic energy as a second antenna, wherein the stripline portion and the conductive feed line are separate elements on the dielectric substrate so that only the conductive feed line is electromagnetically coupled with the one or more conductive cell patches.

2. The apparatus of claim 1, wherein the antenna system is configured to support one or more frequency bands.

3. The apparatus of claim 2, wherein the spatial separation between the conductive feed line with the one or more conductive cell patches is configured to provide a first resonant frequency to the antenna system, and wherein the stripline portion extending from the conductive feed line provides a second resonant frequency to the antenna system.

4. The apparatus of claim 3, wherein the first resonant frequency and the second resonant frequency are within a continuous frequency range so that an S 11 of the antenna system over the frequency range is lower than a predetermined threshold so that the bandwidth of the antenna system is at least the frequency range.

5. The apparatus of claim 3, wherein the stripline portion has a length, wherein varying the length of the stripline portion varies the second resonant frequency.

6. The apparatus of claim 1, wherein the stripline portion comprises a microstrip conductive portion that is electrically connected to the conductive feed line.

7. The apparatus of claim 1, wherein the antenna system further comprises one or more ground planes mounted on said dielectric substrate, and wherein the one or more conductive cell patches are connected by one or more vias to one or more conductive via lines.

8. The apparatus of claim 1, wherein the antenna system comprises a composite right- and left-handed (CRLH) structure.

9. The apparatus of claim 1, wherein the RFID reader is configured to output raw message data containing an encoded message or output decoded message data corresponding to an encoded message.

10. The apparatus of claim 1, wherein the stripline portion is connected directly from a portion of the conductive feed line.

11. The apparatus of claim 1, wherein the antenna system further comprises one or more ground planes mounted on said dielectric substrate, and wherein the one or more conductive cell patches are connected by one or more vias to one or more conductive via lines.

12. The apparatus of claim 1, wherein the antenna system comprises a composite right- and left-handed (CRLH) structure.

13. A system comprising:
    an RFID reader comprising at least one metamaterial antenna mounted on a substrate and is configured to have an overall bandwidth;
    wherein the at least one metamaterial antenna comprises:
        a first antenna comprising:
            one or more conductive cell patches mounted on the substrate;
            a conductive feed line configured to radiate electromagnetic energy at a first resonant frequency and having a first bandwidth, wherein the conductive feed line is separated from but electromagnetically coupled with the one or more conductive cell patches; and
        a second antenna comprising a separate stripline portion extending from the conductive feed line on the substrate and configured to radiate electromagnetic energy at a second resonant frequency and having a second bandwidth,
        wherein the first resonant frequency is different from the second resonant frequency so that the first bandwidth is added to the second bandwidth to comprise the overall bandwidth.

14. The apparatus of claim 13, wherein the first antenna further comprises a one or more conductive cell patches spatially separated from the conductive feed line.

15. The apparatus of claim 13, wherein the first resonant frequency and the second resonant frequency are within a continuous frequency range so that an S 11 of the at least one metamaterial antenna over the frequency range is lower than a predetermined threshold so that the bandwidth of the antenna is at least the frequency range.

16. The apparatus of claim 13, wherein the stripline portion has a length, wherein varying the length of the stripline portion varies the second resonant frequency.

17. An apparatus comprising:
- an RFID reader comprising an antenna system mounted on a dielectric substrate;
- wherein the antenna system comprises:
  - one or more conductive cell patches mounted on the dielectric substrate,
  - a conductive feed line comprising a metallic strip mounted on the dielectric substrate, the conductive feed line being separated from but electromagnetically coupled with the one or more conductive cell patches so that the one or more conductive cell patches radiate electromagnetic energy as a first antenna; and
  - a stripline electrically connected to the conductive feed line so that the stripline radiates electromagnetic energy as a second antenna, wherein the stripline and the conductive feed line are separate elements on the dielectric substrate.

18. The apparatus of claim 17, wherein the spatial separation between the conductive feed line with the one or more conductive cell patches is configured to provide a first resonant frequency to the antenna system, and wherein the stripline extending from the conductive feed line provides a second resonant frequency to the antenna system.

19. The apparatus of claim 18, wherein the first resonant frequency and the second resonant frequency are within a continuous frequency range so that an S 11 of the antenna system over the frequency range is lower than a predetermined threshold so that the bandwidth of the antenna system is at least the frequency range.

20. The apparatus of claim 18, wherein the stripline has a length, wherein varying the length of the stripline portion varies the second resonant frequency.

* * * * *